US 9,439,259 B2

(12) United States Patent
Hagino et al.

(10) Patent No.: US 9,439,259 B2
(45) Date of Patent: Sep. 6, 2016

(54) LED BACKLIGHT DRIVING CIRCUIT FOR LCD PANELS

(75) Inventors: Junichi Hagino, Kyoto (JP); Shingo Haruta, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 75 days.

(21) Appl. No.: 13/354,769

(22) Filed: Jan. 20, 2012

(65) Prior Publication Data

US 2012/0188487 A1 Jul. 26, 2012

(30) Foreign Application Priority Data

Jan. 26, 2011 (JP) ................. 2011-014403

(51) Int. Cl.
G09G 3/36 (2006.01)
H05B 33/08 (2006.01)
G05F 1/40 (2006.01)
G02F 1/1335 (2006.01)

(52) U.S. Cl.
CPC ...... *H05B 33/0848* (2013.01); *H05B 33/0812* (2013.01); *G02F 2001/133612* (2013.01); *G05F 1/40* (2013.01); *Y02B 20/345* (2013.01)

(58) Field of Classification Search
CPC ............ G05F 1/62; G05F 1/00; G05F 3/02; G05F 5/00; H05B 33/0848; H05B 33/0812; G02F 2001/133612
USPC .................. 345/102; 315/224, 291; 323/282
See application file for complete search history.

(56) References Cited

U.S. PATENT DOCUMENTS

| 3,723,892 | A | * | 3/1973 | Julie | 330/300 |
|---|---|---|---|---|---|
| 6,437,956 | B1 | * | 8/2002 | Montrose | 361/56 |
| 8,729,829 | B2 | * | 5/2014 | Serdarevic et al. | 315/307 |
| 2005/0140610 | A1 | * | 6/2005 | Smith et al. | 345/77 |
| 2007/0120506 | A1 | * | 5/2007 | Grant | 315/312 |
| 2010/0220049 | A1 | * | 9/2010 | Murakami | 345/102 |
| 2010/0301760 | A1 | * | 12/2010 | Liu | 315/186 |
| 2011/0062872 | A1 | * | 3/2011 | Jin et al. | 315/122 |
| 2011/0210682 | A1 | * | 9/2011 | Shiu et al. | 315/297 |
| 2012/0013267 | A1 | * | 1/2012 | Yoshio et al. | 315/297 |
| 2012/0036613 | A1 | * | 2/2012 | Calon et al. | 2/171 |
| 2012/0139443 | A1 | * | 6/2012 | Chu | 315/294 |
| 2012/0274877 | A1 | * | 11/2012 | Sasaki et al. | 349/69 |

FOREIGN PATENT DOCUMENTS

JP 2009-188135 A 8/2009
JP 2010-015967 A 1/2010

* cited by examiner

*Primary Examiner* — Chanh Nguyen
*Assistant Examiner* — Yuzhen Shen
(74) *Attorney, Agent, or Firm* — Cantor Colburn LLP

(57) ABSTRACT

A current drive circuit capable of reducing the influence of temperature variation or individual deviation is provided. An output transistor is a PNP bipolar transistor, and has an emitter connected to a cathode of an LED string. A current control resistor is disposed between a collector of the output transistor and a ground terminal. An output terminal of an error amplifier is connected to a base of the output transistor, a first input terminal of the error amplifier is connected to a connection point of the output transistor and the current control resistor, and a reference voltage is applied to a second input terminal of the error amplifier. The error amplifier enables a sink current sunk from the output terminal to flow to the current control resistor.

13 Claims, 3 Drawing Sheets

LED BACKLIGHT DRIVING CIRCUIT FOR LCD PANELS

BACKGROUND OF THE INVENTION

1. Field of the Invention

The present invention relates to a drive circuit of light-emitting diodes (LEDs).

2. Description of the Related Art

In recent years, a light-emitting device using light-emitting diodes (LEDs) is used as back light source or illumination device of a liquid crystal panel. FIG. 1 is a circuit diagram of formation of a light-emitting device studied by inventors of the present invention, in which the light-emitting device 1003 includes an LED string 1006, a switch power supply 1004 and a current source CS.

The LED string 1006 includes a plurality of LEDs connected in series. The switch power supply 1004 boosts an input voltage Vin and supplies a drive voltage Vout for an end of the LED string 1006.

The current source CS is disposed at a path of the LED string 1006. The current source CS supplies a drive current $I_{LED}$ corresponding to a target luminance for a corresponding LED string 1006. The current source CS includes an output transistor Q1, a current control resistor R4, and an operational amplifier OA. The output transistor Q1 is a PNP bipolar transistor, and is disposed on a path of the drive current $I_{LED}$. The current control resistor R4 is disposed between a collector of the output transistor Q1 and a ground terminal. An output terminal of the operational amplifier OA is connected to a base of the output transistor Q1, a reverse input terminal of the operational amplifier OA is connected to the collector of the output transistor Q1, and a reference voltage Vref is input to a non-reverse input terminal of the output transistor Q1.

Through the current source CS, feedback is performed in a manner that a collector potential of the output transistor Q1, that is, a voltage drop of the current control resistor R4 is identical with the reference voltage Vref, a current $I_{R4}$ flowing through the current control resistor R4 is set at a value corresponding to the reference voltage Vref.

The switch power supply 1004 includes an output circuit 1102 and a control integrated circuit (IC) 1100. The output circuit 1102 includes an inductor L1, a switch transistor M1, a rectifier diode D1, and an output capacitor C1. The control IC 1100 adjusts the drive voltage Vout by controlling a duty ratio of ON and OFF of the switch transistor M1. The error amplifier EA amplifies an error between the base voltage Vb of the output transistor Q1 and the reference voltage Vref. The control IC 1100 receives an output signal of the error amplifier EA, and adjusts the output voltage Vout in the manner that the base voltage Vb is identical with the reference voltage Vref.

DOCUMENTS IN THE PRIOR ART

Patent Documents

[Patent Document 1] Japanese Patent Publication No. 2010-015967

[Patent Document 2] Japanese Patent Publication No. 2009-188135

SUMMARY OF THE INVENTION

Problems to be Solved in the Present Invention

The current $I_{R4}$ flowing through the current control resistor R4 is provided according to Equation (1):

$$I_{R4} = Vref/R4 \qquad (1).$$

Additionally, the following relation exits among an emitter current $I_{LED}$, a base current $I_B$, and a collector current $I_{R4}$ of the output transistor Q1:

$$I_{LED} = I_{R4} + I_B \qquad (2).$$

If a current magnification $h_{fe} = I_{R4}/I_B$ of the output transistor Q1 is infinite, it can be considered that $I_B = 0$, thus the following relation is established:

$$I_{LED} \approx I_{R4} = Vref/R4 \qquad (3).$$

However, in practice, the current magnification $h_{fe}$ of the output transistor Q1 is tens to hundreds times, and the base current $I_B$ of the output transistor Q1 is not zero. At this time, the drive current $I_{LED}$ is provided according to Equation (4), and is influenced by the base current $I_B$.

$$I_{LED} = I_{R4} + I_B = (1 + h_{fe}^{-1}) \times I_{R4} = (1 + h_{fe}^{-1}) \times Vref/R4 \qquad (4).$$

When the current magnification $h_{fe}$ changes due to individual deviation or temperature variation of the output transistor Q1, a problem of changing the drive current $I_{LED}$ provided according to Equation (4) occurs. Additionally, the problem cannot be solved in the range of general acknowledge that is common in the field of the present invention.

In view of the above problems, the present invention is achieved, in an exemplary embodiment, a current drive circuit capable of reducing influence of temperature variation or individual deviation is provided.

Technical Means for Solving the Problems

An embodiment of the present invention relates to a drive circuit of a LED string. The drive circuit includes: an output transistor, being a PNP bipolar transistor, in which an emitter of the output transistor is connected to cathode of the LED string; a current control resistor, disposed between a collector of the output transistor and a fixed voltage terminal that is stabilized at a specific potential; and an error amplifier, in which an output terminal of the error amplifier is connected to a base of the output transistor, a first input terminal of the error amplifier is connected to a connection point of the output transistor and the current control resistor, and a reference voltage of the error amplifier is applied to a second input terminal of the error amplifier. The error amplifier enables a sink current sunk from the output terminal to flow to the current control resistor.

The sink current of the error amplifier is equivalent to a base current of the output transistor. The base current is returned back to the current control resistor, so that the current following through the current control resistor is substantially equal to the current flowing through the LED string. As a result, even the current magnification $h_{fe}$ of the output transistor changes due to temperature variation or individual deviation, the influence on the drive current caused by the change can be reduced.

The error amplifier can also include: a differential amplifier; and a sink transistor, wherein an output of the differential amplifier is input to a control terminal of the sink transistor, one end of the sink transistor is connected to the base of the output transistor, and the other end of the sink transistor is connected to the connection point of the output transistor and the current control resistor.

According to this embodiment, the sink current, that is, the base current of the output transistor, is returned to the current control resistor.

The sink transistor can also be an N-channel metal oxide semiconductor field effect transistor (MOSFET).

The sink transistor can also be an NPN bipolar transistor.

In an embodiment, the drive circuit can also include a base-emitter resistor disposed between the base and the emitter of the output transistor.

In order to turn off the output transistor through dimming, the base-emitter resistor is required sometimes. In this case, a current flowing through the base-emitter resistor is returned to the current control resistor as a part of the sink current. Therefore, the influence on the feedback caused by the base-emitter resistor can be reduced.

In an embodiment, the drive circuit can also include a switch power supply, for generating a drive voltage in a manner that a potential of the base of the output transistor is identical with the reference voltage and supplying the drive voltage to an anode of the LED string.

In this case, the feedback is performed in a manner that the base potential and the collector potential of the output transistor are identical with the reference voltage, thereby reducing the loss of the output transistor.

Additionally, in other embodiments of the present invention, a drive circuit is provided. The drive circuit includes: an output transistor, being an NPN bipolar transistor, in which a collector of the output transistor is connected to a cathode of the LED string; a current control resistor, disposed between an emitter of the output transistor and a fixed voltage terminal that is stabilized at a specific potential; and an error amplifier, in which an output terminal of the error amplifier is connected to a base of the output transistor, and a first input terminal of the error amplifier is connected to a connection point of the output transistor and the current control resistor, and a reference voltage is applied to a second input terminal of the error amplifier. A source current of the error amplifier emitted from the output terminal is supplied from the cathode of the LED string.

The source current of the error amplifier is equivalent to a base current of the output transistor. The base current is supplied from the LED string, so that the current flowing through the current control resistor is substantially equal to the current flowing through the LED string. As a result, the influence of temperature variation or individual deviation can be reduced.

The error amplifier can also include: a differential amplifier; and a source transistor, wherein an output of the differential amplifier is input to a control terminal of the differential amplifier, one end of the differential amplifier is connected to the base of the output transistor, and the other end of the differential amplifier is connected to the cathode of the LED string.

According to this embodiment, the source current can be supplied from the LED string.

The source transistor can also be an N-channel metal oxide semiconductor field effect transistor (MOSFET).

The source transistor can also be an NPN bipolar transistor.

In an embodiment, the drive circuit can also include a base-emitter resistor disposed between the base and the emitter of the output transistor.

In order to turn off the output transistor through dimming, the base-emitter resistor is required sometimes. In this case, a current flowing through the base-emitter resistor is returned to the current control resistor as a part of the source current. Therefore, the influence on the feedback caused by the base-emitter resistor is reduced.

In an embodiment, the drive circuit can also include a switch power supply, for generating a drive voltage in a manner that a potential of the collector of the output transistor is identical with a specific second reference voltage and supplying the drive voltage to an anode of the LED string.

Furthermore, in other embodiments of the present invention, a light-emitting device is provided. The device includes an LED string and the drive circuit in any of the above embodiments for driving the LED string.

Furthermore, in other embodiments of the present invention, an electronic device is provided. The electronic device includes a liquid crystal panel and the light-emitting device disposed as a back light source of a LCD panel.

Additionally, any combination of the elements and elements or performance obtained through replacement of the elements or performance of the present invention in the method, the device, and the system can also serve as embodiments of the present invention.

Effect of the Invention

According to an embodiment of the present invention, the influence of temperature variation or individual deviation can be reduced.

PREFERRED EMBODIMENT OF THE PRESENT INVENTION

Figure 1:
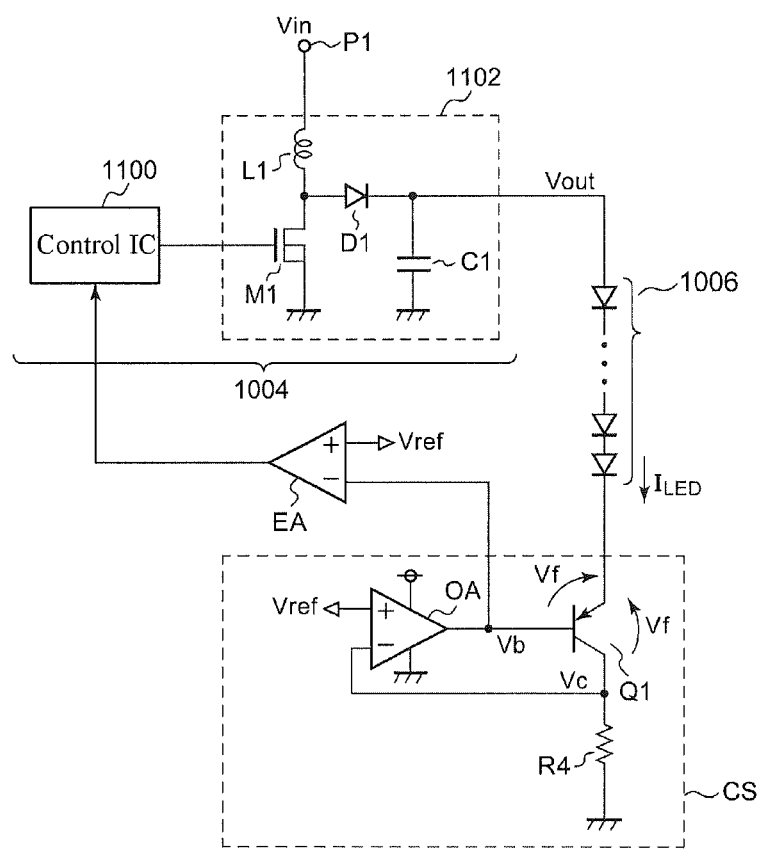
FIG. 1 is a circuit diagram of a light-emitting device according to the present invention.

Hereinafter, preferred embodiments of the present invention are described with reference to accompanying drawings. For the same or equivalent elements, components, and processes in the drawings, the same symbols are attached, and repeated descriptions are omitted. In addition, the embodiments exemplify, rather than limit the present invention. All features and combinations thereof mentioned in the embodiments are not essences of the invention.

In the specification, the so called "connection state between a component A and a component B" includes not only physically direct connection of the component A to the component B, but also the indirect connection of the component A to the component B via an other component without essentially affecting the electrical connection state between the components, or compromising the function and effects exerting by the combination the components.

Similarly, the so called "state in which a component C is disposed between the component A and the component B" includes, in addition to a situation that the component A and component C, or the component B and the component C are directly connected, a situation that the component A and component C, or the component B and the component C are indirectly connected via an other component without essentially affecting the electrical connection state between the components, or compromising the function and effects exerting by the combination of the components.

Figure 2:
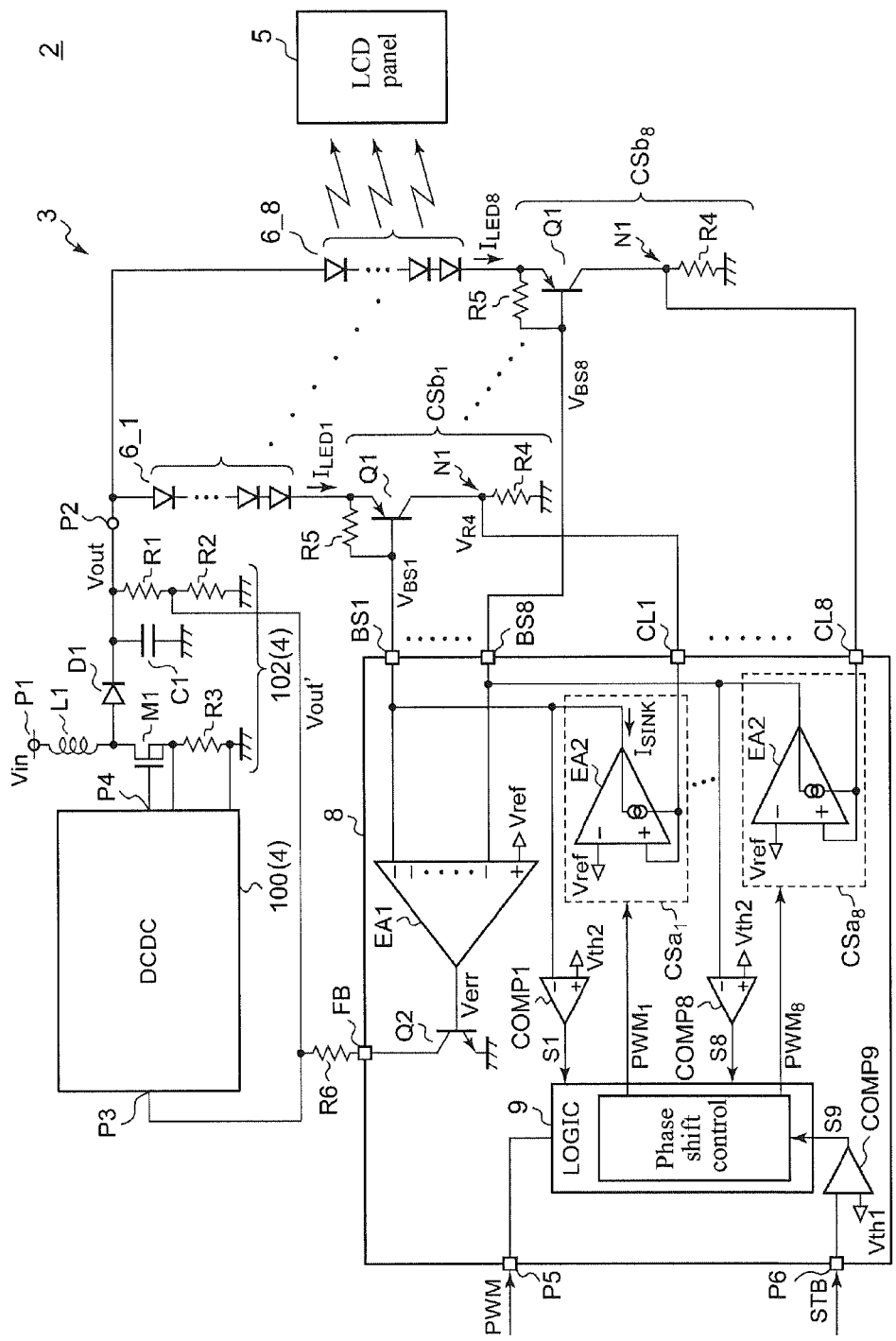
FIG. 2 is a circuit diagram of an electronic device including a light-emitting device according to an embodiment.

FIG. 2 is a circuit diagram of an electronic device 2 including a light-emitting device 3 according to an embodiment.

The electronic device 2 is a battery-driven device such as a notebook personal computer (PC), a digital camera, a digital video camera, a mobile telephone terminal, a personal digital assistant (PDA), and includes a light-emitting device 3 and an LCD panel 5, in which the light-emitting device 3 is disposed to serve as a back light source of the LCD panel 5.

The light-emitting device 3 includes LED string 6_1-6_n as luminous elements, a current drive circuit 8, and a switch power supply 4. The channel number n is determined according to the size of the LCD panel 5 or the type of the electronic device 2 by a designer of the electronic device 2. In FIG. 2, the situation that n=8 is shown.

The LED string 6 includes a plurality of LEDs connected in series. The switch power supply 4 is a boost DC/DC (Direct current) converter to boost an input voltage (for example, a battery voltage) Vin input to an input terminal P1 and output an output voltage (drive voltage) Vout from an output terminal P2, one end (the anode) of each of the plurality of LED string 6_1-6_n is connected to the output terminal P2 respectively.

The switch power supply 4 includes a control IC 100 and an output circuit 102. The output circuit 102 includes an inductor L1, a rectifier diode D1, a switch transistor M1, and an output capacitor C1. A topology of the output circuit 102 is a common structure and details are not described herein.

A switch terminal P4 of the control IC 100 is connected to a gate of the switch transistor M1. The control IC 100 adjusts duty ratio of ON and OFF of the switch transistor M1 through feedback to obtain an output voltage Vout required for lighting up the LED string 6. In addition, the switch transistor M1 can also be mounted in the control IC 100.

Resistors R1 and R2 divides the output voltage Vout to generate a corresponding feedback voltage Vout'. The feedback voltage Vout' is input to a feedback terminal P3 (OVP terminal). An over voltage protection circuit (not shown in the drawings) performs over voltage protection when the feedback voltage Vout' exceeds a threshold.

The current drive circuit 8 is disposed at another end (cathode) side of the plurality of LED string 6_1-6_n. The current drive circuit 8 supplies an intermittent drive current $I_{LED1}$-$I_{LEDn}$ corresponding to a target luminance for the LED string 6_1-6_n.

The current drive circuit 8 includes a plurality of current sources $CS_1$-$CS_n$ disposed for the channels, a burst controller 9, a control input terminal P5, a standby terminal (STB terminal) P6, burst dimming terminals BS1-BS8 for the channels, current control terminals CL1-CL8 for the channels, comparers COMP1-COMP8 for the channels, and a comparer COMP9.

An $i^{th}$ current source $CS_i$ supplies a drive current $I_{LEDi}$ for a corresponding LED string 6_i. The current source $CS_i$ includes output circuits $CSb_i$ and $CSa_i$. The output circuit $CSb_i$ includes an output transistor Q1, a current control resistor R4, and a base-emitter resistor R5. The output transistor Q1 is a PNP bipolar transistor, in which an emitter of the output transistor Q1 is connected to a cathode of the LED string 6_i, and the current control resistor R4 is disposed in series between the emitter of the output transistor Q1 and a fixed voltage terminal (ground terminal) having a fixed potential in sequence. A voltage $V_{R4}$ of a connection point N1 of the current control resistor R4 and the output transistor Q1, that is, a voltage drop of the current control resistor R4, is input to a current control terminal CLi.

The base-emitter resistor R5 is disposed between the base and the emitter of the output transistor Q1. In the following burst dimming, an output impedance of an error amplifier EA2 in an OFF period $T_{OFF}$ is increased, and a base potential of the output transistor Q1 is not fixed. The base-emitter resistor R5 enables the potential difference between the base and the emitter of the output transistor Q1 in the OFF period $T_{OFF}$ to be zero, so as to turn off the output transistor Q1.

The other channels are formed similarly.

A voltage drop $V_{R4}$ proportional to the current $I_{R4}$ flowing through the current control resistor R4 is generated at the current control resistor R4:

$$V_{R4} = I_{R4} \times R4.$$

A control part $CSa_i$ adjusts a base voltage of the output transistor Q1 in a manner that the corresponding voltage drop $V_{R4}$ is identical with the reference voltage Vref. That is, in an ON period, the following relation exists:

$$I_{LEDi} = Vref/R4.$$

The control part $CSa_i$ includes an error amplifier EA2. An output terminal of the error amplifier EA2 is connected to a base of the output transistor Q1, a first input terminal (a non-reverse input terminal) of the error amplifier EA2 is connected to the connection point N1 of the output transistor Q and the current control resistor R4, and a reference voltage Vref is applied to a second input terminal (a reverse input terminal) of the error amplifier EA2. The error amplifier EA2 enables a sink current $I_{SINK}$ sunk from the output terminal to flow to the current control resistor R4.

Through the current source $CS_i$, the feedback is performed in a manner that $V_{R4}$=Vref, so that a drive current $I_{LEDi}$ corresponding to the reference voltage Vref is generated in each channel.

The control input terminal P5 inputs a dimming pulse signal PWM after width modulation used in burst dimming. A first level (for example, a high level) of the dimming pulse signal PWM indicates an ON period $T_{ON}$ of the LED string 6, and a second level (for example, a low level) indicates an OFF period $T_{OFF}$. The duty ratio of the PWM dimming pulse signal PWM, that is the ON period $T_{ON}$ and the OFF period $T_{OFF}$, is in common in all the channels.

The standby terminal P6 inputs a standby signal STB indicating a standby state and an action state of the current drive circuit 8. In particular, when the standby signal STB is at a low level (for example, 0-0.8 V), the current drive circuit 8 is in the standby state. When the standby signal STB is at a high level (>0.8 V), the current drive circuit 8 is in the action state and supplies a drive current for the LED string 6.

The burst controller 9 can switch the following modes, based on a voltage level $V_{STB}$ of the standby signal STB and voltage levels $V_{BS1}$-$V_{BS8}$ of burst dimming terminals BS1-BS8 of 8 channels.

a. Common Mode $\phi_{COM}$ of all Channels

In this mode, the burst controller 9 does not perform phase shift, and regardless of the number of the connected LED string 6, the LED string of all channels that become drive objects are driven in a manner that the phase of the drive currents $I_{LED}$ is uniform. In this mode, the phase difference between the drive currents of the channels is zero, and is recorded as $\phi_0$.

b. Phase Shift Mode $\phi_{SHIFT}$

In this mode, the burst controller 9 drives the LED string of the channels in a manner that the phase of the drive currents shafts. The phase shift mode b includes the following three modes.

b1. 90-Degree Phase Shift Mode $\phi_{90}$

In this mode, the first channel to the fourth channel are set as drive subjects, and the phase shifts for ¼ cycle of the dimming pulse signal PWM with respect to the phase of the drive currents $I_{LED1}$-$I_{LED4}$ of the LED string 6_1-6_4.

b2. 60-Degree Phase Shift Mode $\phi_{60}$

In this mode, with respect to the phase of the drive currents $I_{LED1}$-$I_{LED6}$ of the LED string 6_1-6_6 of the first channel to the sixth channel, the phase shifts for ⅙ cycle of the dimming pulse signal PWM.

b3. 45-Degree Phase Shift Mode $\phi_{45}$

In this mode, with respect to the phase of the drive current $I_{LED1}$-$I_{LED8}$ of the LED string 6_1-6_8 of the first channel to the eight channel, the phase shifts for ⅛ cycle of the dimming pulse signal PWM.

The burst controller 9 generates burst control signals $PWM_1$-$PWM_8$ corresponding to the modes and supplies the burst control signals $PWM_1$-$PWM_8$ to the current source $CS_1$-$CS_8$. When a burst control signal $PWM_i$ is at a high level, the current source $CS_i$ is in the action state and generates a drive current $I_{LEDi}$, thus forming an ON period $T_{ON}$. On the contrary, when the burst control signal $PWM_i$ is at a low level, the current source $CS_i$ is in a standby state, thus forming an OFF period $T_{OFF}$.

After the standby signal STB changes from a low level to a high level and become effective, a period of a fixed time for the standby signal STB becomes a judgment period $T_{JDG}$. The judgment period $T_{JDG}$ is, for example, several cycles of the dimming pulse signal PWM, in particular, about three cycles. In the judgment period $T_{JDG}$, the burst controller 9 judges whether the LED string 6 are connected for channels based on the voltage level $V_{STB}$ of the standby signal STB and the voltage levels $V_{BS1}$-$V_{BS8}$ of the burst dimming terminals BS1-BS8 of the eight channels, and decides the mode according to the judgment result.

In the drive period, the error amplifier EA1 amplifies an error between a lowest voltage $V_{BS}$ in the voltages $V_{BS}$ of the channels of the LED string 6 and the reference voltage Vref (for example, 0.3 V) to generate an error voltage Verr corresponding to the error. The error voltage Verr is output from an FB terminal through a transistor Q2 and a resistor R6 and is input to a feedback terminal of the control IC 100. In the drive period, the control IC 100 adjusts the output voltage Vout in a manner that a lowest voltage $V_{BS}$ in the voltages $V_{BS}$ of the channels connected to the LED string 6 is identical with the reference voltage Vref.

Figure 3:
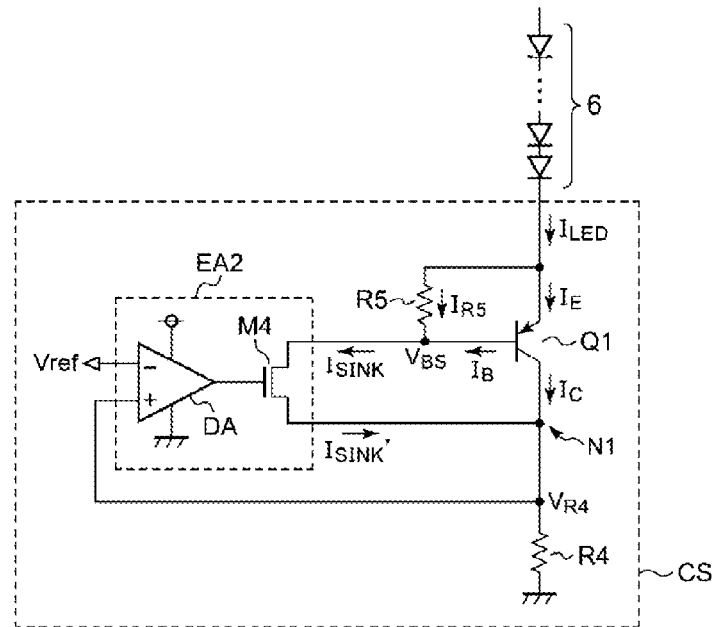
FIG. 3 is a circuit diagram of a specific example of a current source in FIG. 2.

FIG. 3 is a circuit diagram of a specific example of a current source in FIG. 2.

The error amplifier EA2 includes a differential amplifier (operational amplifier) DA and a sink transistor M4. The reference voltage Vref is input to a reverse input terminal of the differential amplifier DA, and the voltage drop $V_{R4}$ of the current control resistor R4 is input to a non-reverse input terminal of the differential amplifier DA.

The sink transistor M4 is, for example, an N-channel MOSFET, an output of the differential amplifier DA is input to a control terminal (gate) of the sink transistor M4. Additionally, one end (a drain) of the sink transistor M4 is connected to the base of the output transistor Q1, and the other end (a source) is connected to the connection point N1 of the output transistor Q1 and the current control resistor R4.

The formation of the light-emitting device 3 is as described above and actions of the light-emitting device 3 are described in the following.

In order to simplify the description, the base-emitter resistor R5 is ignored, and a channel having the lowest base voltage $V_{Bs}$ of the output transistor Q1 in the plurality of channels is focused.

The base voltage $V_{BS}$ of the output transistor Q1 is fed back and control through the switch power supply 4 in the manner that the base voltage $V_{Bs}$ is identical with the reference voltage Vref. Additionally, the voltage drop (a collector voltage of the output transistor Q1) $V_{R4}$ of the current control resistor R4 is fed back and controlled through the current source CS in the manner that the voltage drop $V_{R4}$ is identical with the reference voltage Vref. Therefore, Equation (5) is established:

$$I_{R4} = Vref/R4 \tag{5}$$

That is, feedback is performed in a manner that the base voltage and the collector voltage of the output transistor Q1 are identical with the reference voltage Vref. Therefore, the loss of the output transistor Q1 is reduced.

The sink current $I_{SINK}$ of the error amplifier EA2 is identical with the base current $I_B$ of the output transistor Q1. moreover, in the situation that an MOSFET is used as the sink transistor M4, the drain current is equal to the source current, so the sink current $I_{SINK}$ of the error amplifier EA2 is equal to the current $I_{SINK'}$ of the current control resistor R4. That is, the current $I_{R4}$ flowing through the current control resistor R4 is provided as a sum of the collector current $I_C$ of the output transistor Q1 and the sink current $I_{SINK}$ (=$I_B$):

$$I_{R4} = I_C + I_B \tag{6}$$

In addition, in the output transistor Q1, between the collector current $I_C$, the base current $I_B$, and the emitter current $I_E$ (=$I_{LED}$), Equation (7) is established:

$$I_E = I_B + I_C \tag{7}$$

As it can be known from Equations (6) and (7), the current $I_{R4}$ flowing through the current control resistor R4 is equal to the drive current $I_{LED}$:

$$I_{R4} = I_E = I_{LED} \tag{8}$$

According to Equation (5) and Equation (8), Equation (9) is obtained:

$$I_{LED} = Vref/R4 \tag{9}$$

According to the current source CS in this embodiment, the drive current $I_{LED}$ is not dependent on the base $I_B$ of the output transistor Q1. That is, even when the current magnification $h_{fe}$ of the output transistor Q1 changes due to individual deviation or temperature variation, the drive current $I_{LED}$ is not influenced, so that the luminance of the LED string 6 is stabilized.

Then, take the base-emitter resistor R5 into consideration. At this time, Equations (10)-(13) are established:

$$I_{LED} = I_E + I_{R5} \tag{10}$$

$$I_E = I_C + I_B \tag{11}$$

$$I_{SINK} = I_{R5} + I_B \tag{12}$$

$$I_{SINK'} + I_C = I_{R4} \tag{13}$$

Herein, $I_{R4}$ is a current flowing through the base-emitter resistor R5.

When $I_{SINK} = I_{SINK'}$ is established, from Equations (10) and (12), Equation (14) is obtained; and from Equations (11) and (13), Equation (15) is obtained:

$$I_{LED} = I_E + I_{SINK} - I_B \tag{14}$$

$$I_{R4} = I_{SINK} + I_E - I_B \tag{15}$$

That is, even when the base-emitter resistor R5 is disposed, the drive current $I_{LED}$ is also equal to the current $I_{R4}$ flowing through the current control resistor R4, the drive current $I_{LED}$ is not easily influenced by individual deviation or temperature variation of the output transistor Q1.

In the above, the present invention is described with reference to an embodiment. However, the embodiment is exemplary, and various variation embodiments can exist in the formation elements or the processing processes and combinations thereof. Hereinafter, a variation embodiment is described.

In FIG. 2 and FIG. 3, a situation that a base-emitter resistor R5 is disposed between a base and an emitter of an output transistor Q1 is illustrated, but the present invention is not limited thereto. When an output level of an error amplifier EA2 can be controlled in an OFF period $T_{OFF}$, the base-emitter resistor R5 can be omitted.

In FIG. 3, a situation that an MOSFET is used as a sink transistor M4 is illustrated, but an NPN bipolar transistor can also be used. In this case, due to the influence of a current magnification $h_{fe}$ of the sink transistor M4, a current $I_{SINK}$ and a current $I_{SINK'}$ are not completely identical with each other, but are values slightly different from each other. In this variation embodiment, a drive current $I_{LED}$ is influenced by the current magnification $h_{fe}$ of the sink transistor M4, but the influence is small, as compared with the influence of a current magnification $h_{fe}$ of the output transistor Q1. Therefore, as compared with the formation in FIG. 1, the drive current $I_{LED}$ is stabilized.

Figure 4:
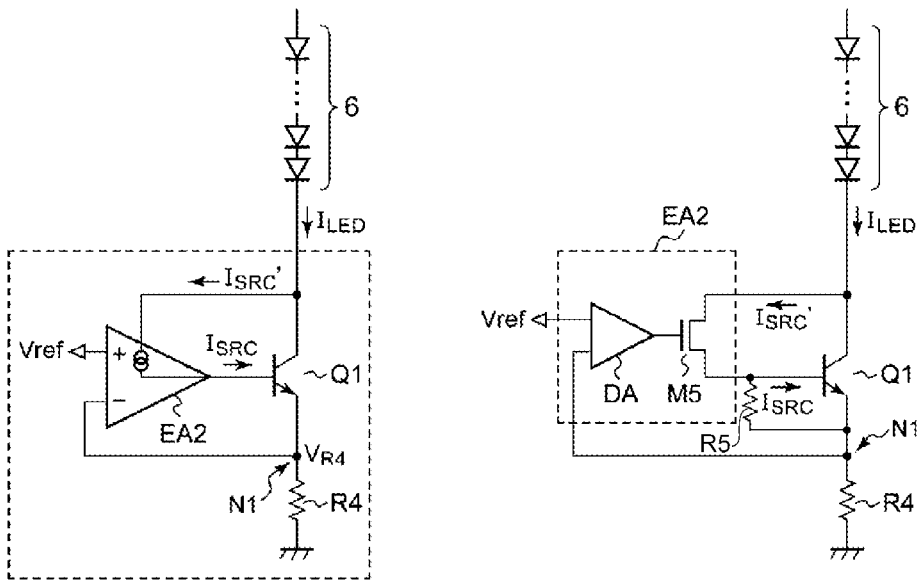
FIG. 4 (a) and FIG. 4 (b) are circuit diagrams of a current source according to a variation embodiment.

FIG. 4 (a) and FIG. 4 (b) are circuit diagrams of a current source CS according to a variation embodiment. In FIG. 4 (a) and FIG. 4 (b), an output transistor Q1 is an NPN bipolar transistor, in which a collector of the output transistor Q1 is connected to a cathode of an LED string 6. A current control resistor R4 is disposed between an emitter of the output transistor Q1 and a fixed voltage terminal (ground terminal) that is stabilized at a specific potential.

An output terminal of an error amplifier EA2 is connected to a base of the output transistor Q1, a first input terminal (a reverse input terminal) of the error amplifier EA2 is connected to a connection point N1 of the output transistor Q1 and the current control resistor R4, and a reference voltage Vref is applied to a second input terminal (non-reverse input terminal) of the error amplifier EA2.

A source current $I_{SRC}$ of the error amplifier EA2 emitted from the output terminal is supplied from a cathode of the LED string 6. As shown in FIG. 4 (b), the error amplifier EA2 can also include a differential amplifier DA and a source transistor M5. An output of the differential amplifier DA is input to a control terminal of a source transistor M5, one end of the source transistor M5 is connected to the base of the output transistor Q1, and the other end is connected to the cathode of the LED string 6. The source transistor M5 is preferably an MOSFET, but in a situation that minor changes are allowed, a bipolar transistor can also be used.

In the variation embodiment in FIG. 4 (a) and FIG. 4 (b), a drive current $I_{LED}$ is equal to a current $I_{R4}$. Therefore, the drive current $I_{LED}$ is not easily influenced changes in a current magnification $h_{fe}$ of the output transistor Q1, so that the drive current $I_{LED}$ is stabilized.

In the variation embodiment in FIG. 4 (a) and FIG. 4 (b), in an OFF period $T_{OFF}$, a base potential of the output transistor Q1 is decreased, so a resistor 5 can also be disposed between the base and the emitter. The base-emitter resistor R5 can also be disposed between the base and a ground terminal of the output transistor Q1. In a situation that the variation embodiment in FIG. 4 (a) and FIG. 4 (b) is applied to the system in FIG. 2, a collector voltage of the can also be fed back to the reverse input terminal (−) of the error amplifier EA2. Additionally, a second reference voltage greater than the reference voltage Vref can be applied to the non-reverse input terminal (+).

The specific formation of the error amplifier EA2 is not limited to the formation described in the embodiments. In the embodiments, the situation that transistors M4 and M5 are disposed at an output section of the error amplifier EA2 is described, but, the output section can also be formed in a push-pull manner.

In the embodiments, a non-insulated switching power supply using an inductor is described, but the present invention can also be applied to an insulated switching power supply using a transformer.

In the embodiments, an electronic device is described as an application of the light-emitting device 3, but the use of the light-emitting device 3 is not particularly limited, and the light-emitting device 3 can also be used for lighting.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. All such modifications are intended to be within the scope of the claims appended hereto.

What is claimed is:

1. A drive circuit, for driving a light-emitting diode (LED) string, comprising:
    an output transistor, being a PNP bipolar transistor, wherein an emitter of the output transistor is connected to a cathode of the LED string;
    a current control resistor, disposed between a collector of the output transistor and a fixed voltage terminal that is stabilized at a specific potential;
    a first error amplifier, wherein an output terminal of the first error amplifier is connected to a base of the output transistor, a first input terminal of the first error amplifier is connected to a connection point of the output transistor and the current control resistor, and a first reference voltage is applied to a second input terminal of the first error amplifier, and the first error amplifier enables a sink current sunk from the output terminal to flow to the current control resistor;
    a switch power supply, providing an output voltage to an anode of the LED string and inputting a feedback voltage based on the output voltage to a feedback terminal;
    a second error amplifier, amplifying an error between a base voltage of the output transistor and a second reference voltage and generating an error voltage according to the error;
    a transistor, wherein a first terminal of the transistor is connected to the error voltage; and
    a feedback voltage control resistor having a first end connected to a second terminal of the transistor and a second end connected to the feedback terminal, and the error voltage being output through the transistor and the feedback voltage control resistor and being input to the feedback terminal.

2. The drive circuit according to claim 1, wherein the first error amplifier comprises:
    a differential amplifier having a non-inverting input terminal and an inverting input terminal; and a sink transistor, wherein an output of the differential amplifier is input to a control terminal of the sink transistor, and one end of the sink transistor is connected to the base of the output transistor, and the other end of the sink transistor is connected to the connection point of the output transistor and the current control resistor;

wherein the non-inverting input terminal is connected to the collector of the output transistor; and the first reference voltage is input into the inverting input terminal.

3. The drive circuit according to claim 2, wherein the sink transistor is an N-channel metal oxide semiconductor field effect transistor (MOSFET).

4. The drive circuit according to claim 2, wherein the sink transistor is an NPN bipolar transistor.

5. The drive circuit according to claim 1, further comprising a base-emitter resistor, disposed between the base and the emitter of the output transistor.

6. The drive circuit according to claim 1, further comprising a switch power supply, for generating a drive voltage in a manner that a potential of the base of the output transistor is identical with the reference voltage and supplying the drive voltage to an anode of the LED string.

7. A light-emitting device, comprising:
a light-emitting diode (LED) string; and
the drive circuit according to claim 1, for driving the LED string.

8. An electronic device, comprising:
a liquid crystal panel; and
the light-emitting device according to claim 7, disposed for serving as a back light source of the liquid crystal panel.

9. A drive circuit, for driving a light-emitting diode (LED) string, comprising:
an output transistor, being an NPN bipolar transistor, wherein a collector of the output transistor is connected to a cathode of the LED string;
a current control resistor, disposed between an emitter of the output transistor and a fixed voltage terminal that is stabilized at a specific potential;
a first error amplifier, wherein an output terminal of the first error amplifier is connected to a base of the output transistor, a first input terminal of the first error amplifier is connected to a connection point of the output transistor and the current control resistor, and a reference voltage is applied to a second input terminal of the first error amplifier, and a source current of the first error amplifier emitted from the output terminal is supplied from the cathode of the LED string;
a switch power supply, providing an output voltage to an anode of the LED string and inputting a feedback voltage based on the output voltage to a feedback terminal;
a second error amplifier, amplifying an error between a base voltage of the output transistor and a second reference voltage and generating an error voltage according to the error;
a transistor, wherein a first terminal of the transistor is connected to the error voltage; and
a feedback voltage control resistor having a first end connected to a second terminal of the transistor and a second end connected to the feedback terminal, and the error voltage being output through the transistor and the feedback voltage control resistor and being input to the feedback terminal.

10. The drive circuit according to claim 9, wherein the first error amplifier comprises:
a differential amplifier; and
a source transistor, wherein an output of the differential amplifier is input to a control terminal of the source transistor, one end of the source transistor is connected to the base of the output transistor, and the other end of the source transistor is connected to the cathode of the LED string.

11. The drive circuit according to claim 10, wherein the source transistor is an N-channel metal oxide semiconductor field effect transistor (MOSFET).

12. The drive circuit according to claim 10, wherein the source transistor is an NPN bipolar transistor.

13. The drive circuit according to claim 9, further comprising a base-emitter resistor, disposed between the base and the emitter of the output transistor.

* * * * *